United States Patent
Pepper et al.

(10) Patent No.: US 7,233,726 B1
(45) Date of Patent: Jun. 19, 2007

(54) COMPACT PHASE-CONJUGATE MIRROR AND OTHER OPTIC DEVICES

(75) Inventors: David M. Pepper, Malibu, CA (US); Hans W. Bruesselbach, Monte Nido, CA (US); Monica Minden, Monte Nido, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/231,261

(22) Filed: Sep. 19, 2005

(51) Int. Cl.
*G02B 6/02* (2006.01)

(52) U.S. Cl. ....................................... 385/125

(58) Field of Classification Search ................ 385/125
See application file for complete search history.

(56) References Cited

U.S. PATENT DOCUMENTS

| | | | |
|---|---|---|---|
| 6,301,421 B1 * | 10/2001 | Wickham et al. ........... | 385/126 |
| 6,640,037 B2 * | 10/2003 | Gallagher .................. | 385/125 |
| 6,788,865 B2 * | 9/2004 | Kawanishi et al. ......... | 385/125 |
| 6,917,741 B2 * | 7/2005 | Fekety et al. .............. | 385/125 |
| 6,950,585 B2 * | 9/2005 | Forbes et al. .............. | 385/123 |
| 6,987,783 B2 * | 1/2006 | Fajardo et al. ............. | 372/6 |
| 2005/0024719 A1 * | 2/2005 | Nakata ..................... | 359/368 |
| 2005/0238301 A1 * | 10/2005 | Russell et al. ............. | 385/113 |
| 2006/0088260 A1 * | 4/2006 | Williams et al. ........... | 385/123 |
| 2006/0165360 A1 | 7/2006 | Siegel et al. ............... | 385/125 |
| 2006/0230792 A1 * | 10/2006 | Sanghera et al. ........... | 65/389 |

* cited by examiner

*Primary Examiner*—Ellen E. Kim
(74) *Attorney, Agent, or Firm*—Ladas & Parry

(57) ABSTRACT

A phase-conjugate mirror has a length of hollow core photonic crystal multi-spatial mode, polarization-maintaining fiber disposed in a vessel, with a compressible and preferably gaseous medium, such as Xe or CH4, occupying the hollow core of the of hollow core photonic crystal fiber and surrounding the exterior of the hollow core photonic crystal fiber. At least one sealed window is provided in the vessel, the at least one sealed window being optically coupled to at least one end of the length of hollow core photonic crystal fiber.

19 Claims, 3 Drawing Sheets

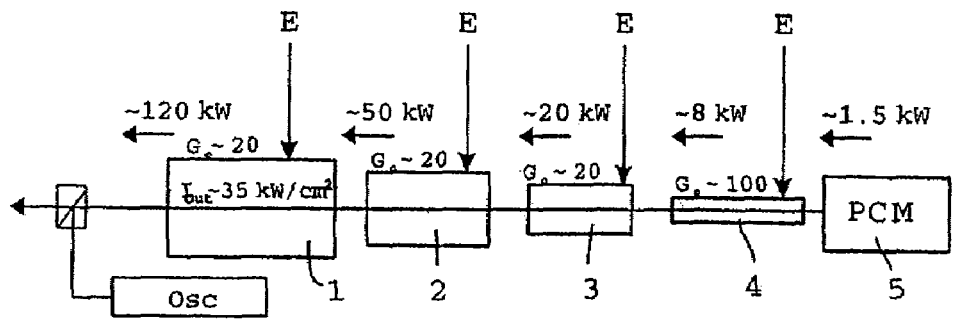
Figure 1
(Prior Art)
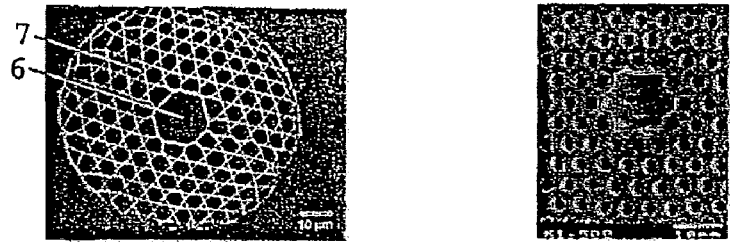
Figure 1a
(Prior Art)
Figure 1b
(Prior Art)
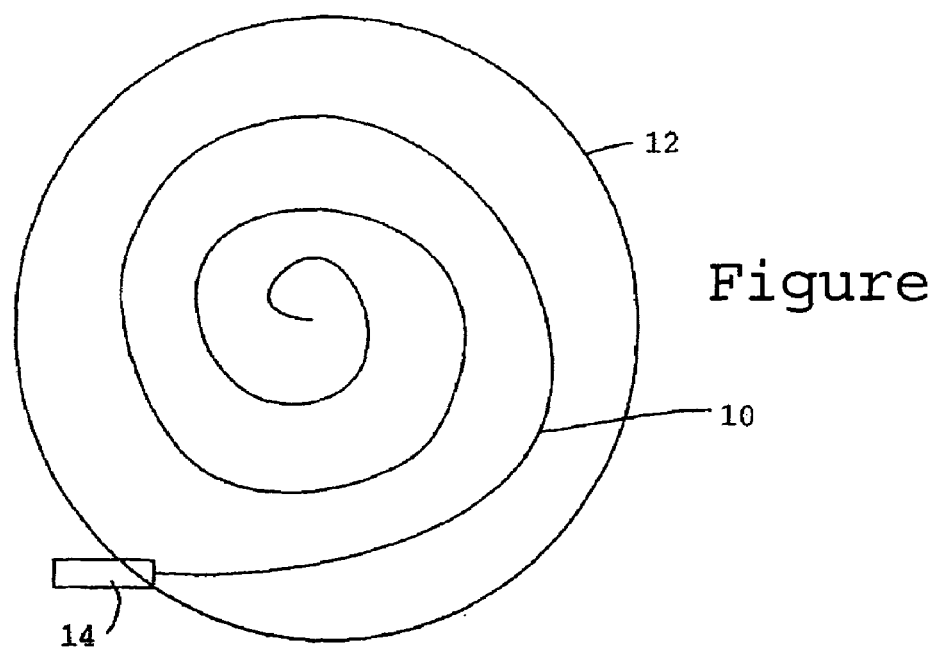
Figure 2

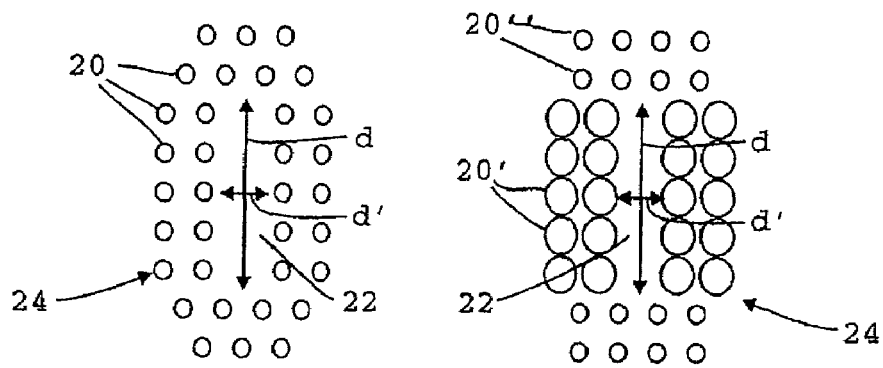
Figure 5a    Figure 5b
Figure 5c
Figure 5d
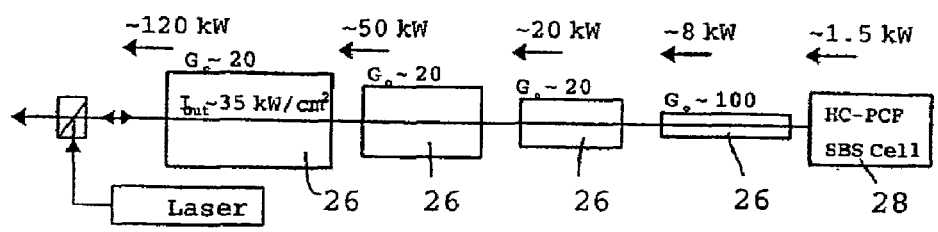
Figure 6

COMPACT PHASE-CONJUGATE MIRROR AND OTHER OPTIC DEVICES

TECHNICAL FIELD

This invention is directed to the use of a hollow-core photonic crystal fiber (HC-PCF) as a guiding structure for a passive optical devices, including a self-pumped, stimulated scattering, phase-conjugate mirror (PCM).

BACKGROUND OF THE DISCLOSURE

Hollow-core photonic crystal fibers are designed to guide optical beams via Bragg reflection at the core/cladding interface along the structure, as opposed to conventional fibers that guide light via total internal reflection along the waveguide. This property enables the fiber to guide light down its "core," whose refractive index can be less than that of the cladding, even air or vacuum. Owing to the guided-wave nature of these fibers, the hollow core of the fiber can be filled with a variety of low or high refractive-index states of matter, including gases, cryogenic liquids ($LN_2$), or critical-point media (ethane, Freon 113). By using such fibers, long interaction lengths can be realized that can far exceed lengths typical of free-space, focused media. This enables nonlinear optical interactions to be observed for laser powers not previously possible in short-interaction-length geometries.

This disclosure addresses PCMs via stimulated Raman, Brillouin or thermal scattering (SRS, SBS, STS respectively), externally seeded SBS or Brillouin-enhanced four-wave mixing (BEFWM). Since more than one spatial mode is required for wavefront-reversal of a general beam, a multi-mode HC-PCF will be required. In addition, a polarization-preserving HC-PCF is desirable as it will enable lower-threshold, high-fidelity wavefront reversal.

SBS conjugators have a rich history, being the first "self-pumped," all-optical, passive wavefront compensator applied to solid-state lasers, MOPAs and energy-scalable architectures. See B. Ya. Zel'dovich, N. F. Pilipetsky, and V. V. Shkunov, *Principles of Phase Conjugation*, Springer Ser. Opt. Sci. 42, T. Tamir, Ed., Berlin, 1985 and D. M. Pepper, "Nonlinear Optical Phase Conjugation," in *The Laser Handbook*, Vol. 4, M. L. Stitch and M. Bass, Editors (North Holland Publishing Company, The Netherlands, 1985), SBS PCMs are both simple and elegant: they typically use high-pressure gases with only a single input beam focused into the cell—the very beam whose wavefront-reversed replica is sought. The "time-reversed" beam is generated over the same focal volume as the input beam. Gases have been the most attractive SBS medium, and have proven themselves average-power scalable where the aberrations are small enough and the peak power high enough so that simple free-space focusing in a cell achieves threshold. They have thus found application to short-pulse, high-peak-power lasers. Low thresholds for highly aberrant beams, suitable for CW HELs, can be realized using SBS if guiding structures are used. Until now, however, suitable guiding structures did not exist for low-index media such as gases.

Using HC-PCF technology, new classes of simple and elegant PCMs may be realized using materials not previously employed. The emergence of hollow-core photonic crystal fiber (HC-PCF) enables one to realize PCMs with materials that can be configured into long interaction lengths. Such a device can service new wavelength regions (uv through the IR) as well as energy and power-scalable lasers (such as weapon-class lasers). In addition, now-classic SBS-based PCM configurations can now be made practical for a variety of applications, including de-polarization compensation and novel SBS-based power-scaling and output couplers as well as low-power applications owing to the long interaction lengths and confined (high-intensity) modes possible using HC-PCF. Prior to the development of the guided-wave structure (the HC-PCF), PCMs using waveguide geometries were constrained to materials with a refractive index greater than that of the cladding material of the guide (typically glass), thus limiting such devices to glass cores and a very limited number of high-index liquids whose reflective index is greater than that of glass ($n_{glass} \approx 1.5$) lightpipes, such as $CS_2$-filled capillaries. These nonlinear media have several limitations including competing nonlinear interactions, such as self-focusing, photochemical degradation, Raman scattering, and optical breakdown. Gases typically have higher thresholds for these competing effects, and, Xe (a promising candidate), in particular, has no Raman effect (it is an atom, not a molecule), with extremely high breakdown threshold.

Another feature of this disclosure is that it addresses high-power scaling of lasers. Traditionally, high-peak-power, yet, low average power, pulsed lasers are best suited for NLO interactions to be practical, owing to the higher order NLO optical processes (e.g., SBS). Currently, "loop" PCMs are being studied in the high-average power regime, but they have thermal, FOV, and fidelity limitations. The present approach circumvents these limitations and enables efficient NLO (SBS) PCMs to be realized using continuous-wave lasers with low-peak power, yet, scalable to high average powers, thereby opening up new classes of devices to service myriad applications.

Presently, PCMs provide a solution to realizing scalable, diffraction-limited lasers. The prior art includes a variety of phase-conjugate techniques for scaling of lasers, including SBS and photorefractive based devices. The SBS interaction works best with high-peak power lasers, owing to the constrained (limited) interaction lengths in free-space gas cells. SBS in solids and liquids suffer from optical damage, photochemical degradation, and competing nonlinear optical effects, such as optical breakdown, filamentation, SRS, self-phase modulation and self-focusing. On the other hand, the photorefractive materials suffer from optical damage (catastrophic, depoling) at high intensities and thermal effects at high optical absorption. However, SBS PCMs (the PCM of choice) function best under operating conditions of high-peak power and low-average power. To realize various classes of DEWs, a scalable laser is required to function at high-average powers, in the long pulse (quasi-cw) and cw regimes, which is counter to operational parameters preferred for SBS devices. Recently, so-called "loop" PCMs have been employed by HRL and Raytheon with limited success at the required laser powers, but suffer from limited wavefront-reversal fidelity, resulting in a loss of brightness. Our approach shows great promise to fill the gap, and, thus, provide a mitigation candidate for this important element in a DEW system.

Such a laser can also enable one to realize a source for manufacturing applications, including welding and drilling. The "loop" PCMs use either thermal nonlinearities as real-time holographic gratings at a loop vertex, as well as optical gain elements as the nonlinear medium. The loop devices have design constraints owing to the thermal nonlinearity, which can limit the phase-conjugate fidelity and FOV, especially as one scales to high-average powers. The optical gain media are promising, but, may also have limitations at high-average powers, since operation is constrained to intensities on the order of the saturation intensity of the medium (where, presumably, the induced gratings have the greatest phase-conjugate Bragg selectivity). In addition, being an active material, additional prime power is required to optically invert the energy-level populations. Finally, being an oscillator, the loop geometries are much more complex than passive PCMs (e.g., this invention) and, possess potential pulsation effects, which can cause optical damage at high-powers, as well as potentially damage the materials that are processed by the output power, such as laser welders, etc.

FIG. 1 is a schematic diagram of a representative Phase Conjugate Master Oscillator Power Amplifier (PC-MOPA) schematic which represents an application of a high peak power, high-energy scaled laser system using a series of laser amplifiers 1-4 easing using external excitation E. A PCM 5 is employed to result in a diffraction-limited high brightness system output. The use of a HC-PCF as the PCM 5, as disclosed herein, can enable this prior art system to also function as a high-average power (quasi-CW) system for material processing and DEWs. The prior art was limited to very short pulses so that high peak powers were obtainable which is required by prior art PCMs. That is, prior art systems were limited by the devices, whereas the present invention can enable more applications and systems to be realized.

This invention is not obvious given the prior art of which the inventor is aware. The prior art does, indeed, discuss how to realize PCMs using SBS. However, in all these cases where gas is used as the nonlinear medium, free-space focusing is described, since, "conventional wisdom" compels one to reason that guided-wave structures require guiding materials with refractive indices greater than the cladding (confining) layers in an optical waveguide. Researchers have, in the past, employed glass cores with in-diffusion of selected gases, such as $H_2$, as a means to realize Raman scattering over long interaction lengths, but, such an approach was not very practical and remained an intellectual curiosity for the past 2 decades. SBS was, indeed, observed using liquid-filled guides, filled with high-index media, such as $CS_2$. Again, the paradigm here was to limit the guiding material to candidates with a refractive index greater than the glass guide ($n_{CS_2} \approx 1.62 > n_{glass} \approx 1.5$). Therefore, the community would not have considered guiding light in a gas, or a cryogenic liquid or critical point media, owing to the fact that its index ($\approx 1$) is far less than the cladding glass layer(s).

The emergence of HC-PCF opens the door to realizing optical guiding in media whose index is less than that of the cladding. In fact, several papers have been published that describe Raman scattering in single-mode HC-PCFs, filled with $H_2$. Also, a paper by F. Benabid, J. C. Knight, G. Antonopoulos, and P. St. J. Russell, "Stimulated Raman Scattering in Hydrogen-Filled Hollow-Core Photonic Crystal Fiber", Science 298, 399 (2002) discusses employing a Xe-filled, single-mode HC-PCF to demonstrate high-peak power pulsed laser propagation over long lengths; the goal of this system is to confine very short pulses of high peak power over very long distances for long-haul communication purposes, without pulse spreading, etc. The optimized system was designed using a single-mode HC-PCF, with a gas fill, which would minimize any and all nonlinear optical effects, which can limit the system bandwidth. The Xe gas fill was selected for several reasons to optimize the communication application of the HC-PCF. For example, the presence of Xe enables very high peak powers to be confined with minimal nonlinear effects (since Xe does not have a Raman effect and, moreover, Xe has a much smaller non-linear index effect relative to air). The operating conditions, as well as the pressure of the Xe gas were also chosen so that gIL>10 to avoid SBS, which would be unwelcome in their communication application, where g is the SBS gain, I is the optical intensity and L is length. For long-haul communication links, the technical community also specifies the use of single-mode fibers, since multi-mode fibers can limit the communication bandwidth due to modal dispersion. Hence, a multimodal fiber would be deleterious in such an application, and therefore, designers of long haul communication systems specifically avoid that class of fiber.

Now, one may suppose that, given these efforts, the extension to multi-mode HC-PCFs using SBS would be obvious. However, in phone discussions (by the first named inventor) with several experts in this technology area, where the topic of multi-mode HC-PCFs was mentioned (not in regard to this disclosure, but, in the general context of modal dispersion), none of the researchers ever considered the topic of multi-mode propagation in these structures, much less polarization effects again since the goal of the technical community involves long-haul fiber communication links. Given that these two effects (even in the linear regime) are very general, and, moreover, that they represent critical technological issues that are necessary to understand in arriving at this invention (not to mention SBS, etc.), it appears that the technical community has yet to consider the notions discussed in this disclosure.

BRIEF DESCRIPTION OF THE FIGURES

FIG. 1 is a schematic diagram of a representative PC-MOPA schematic which represents an application of a high peak power, high energy scaled laser system using a series of laser amplifiers, as discussed above.

FIG. 1a is an end view of a prior art HC-PCF made by Banabid.

FIG. 1b is an end view of a prior art HC-PCF made at the University of Bath.

FIG. 2 is a top view of a phase conjugate mirror embodied as a Xe or $CH_4$ gas filled HC-PCF in sealed tube.

FIGS. 5a and 5b a cross section views through embodiments of a polarization-maintaining HC-PCF.

FIGS. 5c and 5d a side views through embodiments of a polarization-maintaining HC-PCF.

FIG. 6 is a schematic diagram of a representative PC-MOPA schematic which represents an application of a high peak power, high energy scaled laser system using a series of HC laser amplifiers.

DETAILED DESCRIPTION

This disclosure describes a power-scalable Stimulated Brillouin Scattering (SBS) phase conjugate mirror (PCM). This passive PCM utilizes SBS in a novel structure: a multi-spatial mode, polarization-maintaining, gas-filled, hollow-core photonic crystal fiber (HC-PCF). This novel HC-PCF waveguide now enables realization of the simplest and most elegant PCM approach, SBS, in a gas-filled, guided-wave structure. FIGS. 1, 1a and 1b depict a representative PC-MOPA schematic and end views of HC-PCFs by Benabid and the University of Bath. Having the potential for rapid technology insertion into the tens-of-kilowatt laser systems currently under development, the HC-PCF PCM provides the technical community with a viable alternative technology candidates relative to currently pursued technologies, such as "loop" PCMs, etc.

There are several variants of the basic geometry. For example, the PCM can be realized using a self-pumped configuration, where only a single beam is incident onto the input port of the fiber. A second variation involves a "seeded" scheme, whereby a Brillouin-shifted, low-power beam (with many random spatial modes and phases) is injected into the exit port, or, back-end, of the fiber as a "seeded" beam, which has the potential to lower the effective threshold, with fidelity as a tradeoff. A third variation involves a Brillouin-enhanced four-wave mixing (so-called BEFWM) scheme, whereby a Brillouin shifted beam, along with an auxiliary beam, are injected into the each respective end of the fiber. Such a scheme, in the case of a free-space structure, has the added benefit of preserving the (narrow) bandwidth of the input beam, as well as enabling one to encode modulation onto the wavefront-reversed replica (see U.S. Pat. No. 4,958,908 by Rockwell, Lind, and Pepper).

A PCM using SBS in multimode, polarization-preserving HC-PCFs is a viable approach to realizing a scalable kilowatt-level PCM and thus provide high-fidelity wavefront reversal of highly aberrated input beams. Table 1 summarizes a point design, capable of conjugating highly aberrant (~200 times diffraction-limited) HEL beams via SBS in a methane-filled or a xenon-filled HC-PCF.

The vessel 12 and the interior core of the HC-PCF 10 therein is filled with a gaseous medium, preferably Xe or $CH_4$, but most preferably Xe.

Figure 3:
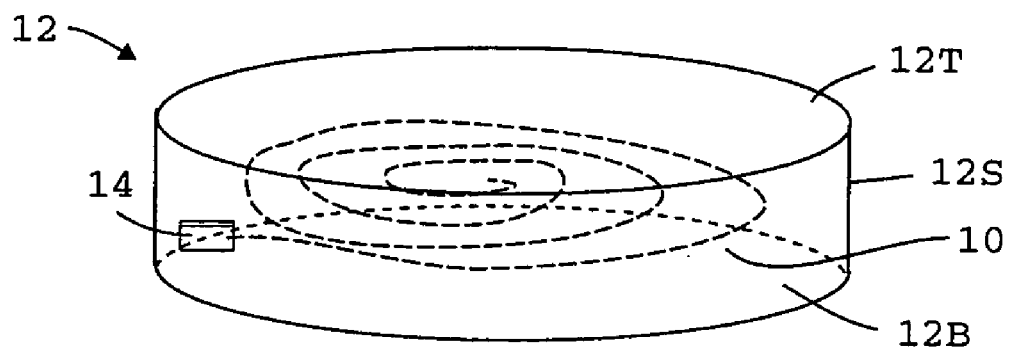
FIG. 3 is a perspective view of the embodiment of FIG. 2.

In FIGS. 2 and 3 the number of loops required for the HC-PCF have been reduced for ease of illustration; however, in typical embodiments there will likely be several tens of loops upwards to perhaps a hundred or more loops. In FIG. 2 the vessel 12 is shown with its top surface 12T (see FIG. 3) removed while in FIG. 3 the vessel 12 is shown with its top 12T, sidewalls 12S, and bottom wall 12B, in place, to help reiterate the fact that the vessel 12 is preferably hermetically sealed (although it may well be equipped with a pressure sensor and an external ballast supply of gas—Xe or $CH_4$—in order to overcome any small leaks which might occur in use and/or with a gas recirculation system to help remove heat due to light absorption by the PCM). Owing to the very highly confined modes in the HC-PCF 10, the diameter of the loops can be much smaller (i.e., more tightly wound) than conventional glass fibers since the bending losses are much lower in HC-PCFs 10.

Figure 4:
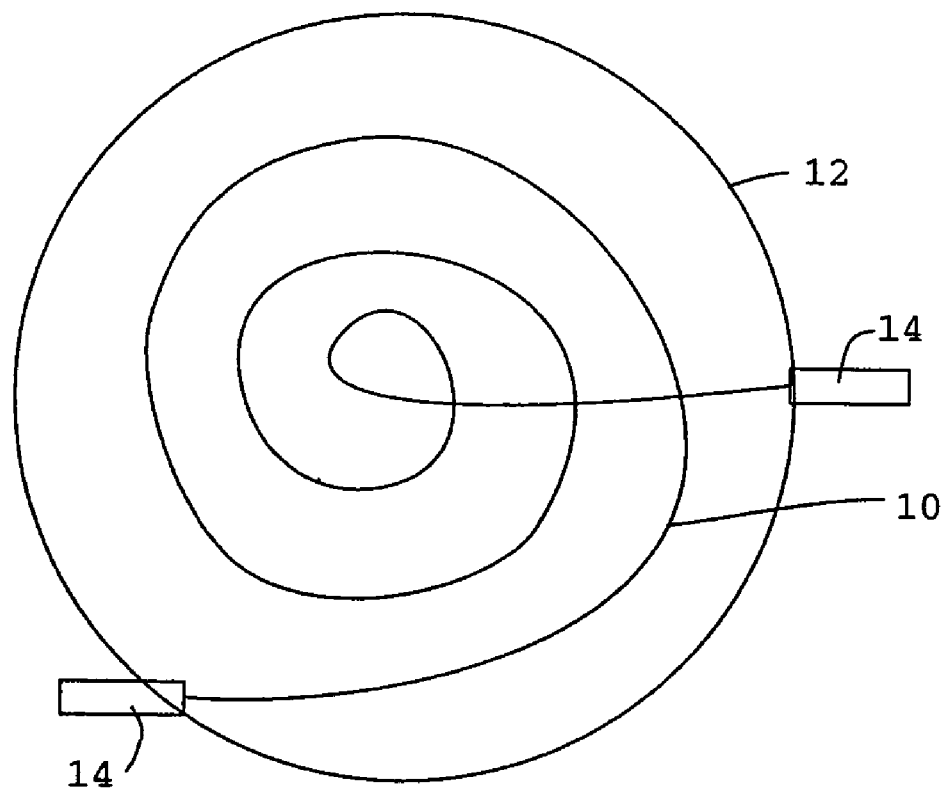
FIG. 4 depicts an embodiment of the PCM with a sealed optical window at each end of the HC-PCF.

FIG. 4 depicts an embodiment of the PCM with a sealed optical window 14 at each end of the HC-PCF 10. The additional window 14 can be used, for example, as a beam dump for unconjugated light or for a seeding beam.

In each of the previously described embodiments, one or more windows 14 are shown in the sidewalls 12S, however, the windows 14 can, of course, be placed in the other walls

|  | SBS gain g | Linewidth | Shift | Sound Speed | refractive index | Phase Mismatch $k_gL$ | gIL | The "Local Condition" is Satisfied if linewidth over shift over angle squared is small |
|---|---|---|---|---|---|---|---|---|
| Methane | 8 cm/GW | 53 MHz | 0.902 GHz 0.19 $cm^{-1}$ | 0.46 km/sec | 1.01 | 95.42 | 5.1 | 0.22 |
| Xenon | 47 cm/GW | 5 MHz | 0.360 GHz 0.08 $cm^{-1}$ | 0.18 km/sec | 1.03 | 38.83 | 29.9 | 0.05 |

Table 1, above, sets forth parameters important for SBS conjugator design. If 400 W input is assumed, a 5 m-long 200 μm core diameter, Xenon-filled HC-PCF is well above SBS threshold of gIL≈10, where g is a materials parameter (SBS gain), I is the intensity in the interaction region, and L is the length of the interaction region.

Turning to FIGS. 2 and 3, in its simplest embodiment, a compact, self-pumped PCM would consist of a HC-PCF 10 of several meters in length, coiled up, mounted and/or housed in a gas-filled, hollow, closed cylindrical vessel 12 (which may be, for example, about 8–10 cm in circumference with an inside diameter of about 2.5 cm and a height of about 1.5 cm), preferably made of stainless steel or other suitable material, with one or more optical windows 14 sealed onto the therein for at least one and perhaps both ends of the HC-PCF. The optical windows are preferably wedge-shaped to prevent reflections from re-entering the structure, and more preferably are disposed at Brewster's angle to minimize reflective losses of the desired polarization states. In this manner, there would be zero differential gas pressure between the hollow fiber core 1 of the HC-PCF 10 and surrounding "webbed" Bragg cladding structure 2 (see, e.g., FIG. 1a). The vessel 12 can also be filled with a porous packing material (not shown) to minimize mechanical shocks as well as to provide thermal contact for the HC-PCF 10 with the interior walls of vessel 12 for heat removal.

Whether one or two windows 14 are needed in the vessel 12 will depend on whether a self-pumped or a "seeded" beam embodiment is desired.

or surfaces of the vessel 12 if preferred. The vessel 12 preferably has a cylindrical shape, due to the fact the HC-PCF 10 can be conveniently coiled inside such a shape, but the vessel or container 12 can certainly assume any geometric or non-geometric shape as a matter of design choice.

The HC-PCF is preferably polarization maintaining when used in the PCM disclosed herein. However, the prior art HC-PCF shown in FIGS. 1a and 1b are not polarization-maintaining.

FIGS. 5a and 5b are cross section views through very small diameter glass tubes 20 (with very thin walls so that they each have a hollow center portion). In the embodiment of FIG. 5a each tube 20 has a common diameter. In the embodiment of FIG. 5b one group of tubes 20' has a relatively larger outer diameter while a second group of tubes 20" has a relatively smaller outer diameter. In both embodiments there is a central region 22 which has an oval or rectangular shape, in cross section, so that one dimension d is greater than the other dimension d'. (The dimensions d and d' are taken at a right angle to each other). In the case of FIG. 5b, the cross section of the central region 22 can also be circular (d=d'), since the different diameter tubes in the orthogonal directions (20' and 20") effectively break the circular symmetry of the orthogonal electromagnetic eigen-modes that propagate through the HC-PFC, thereby preserving the polarization of the image-bearing propagating beam, even though the geometrical diameter of the central region is circular.

Also, the bundles 24 of glass tubes 20, 20', 20" are shown with the individual tubes spaced apart for clearly of illustration, it being understood that they would be much more numerous than shown and would be touching adjacent tubes. The central region 22 would typically be formed by its own tube of larger diameter than the depicted tubes 20, 20', 20" surrounding it. The bundles 24 are heated and drawn in order to form a HC-PCF 10. If the central region 22, after drawing, still has a oval or rectangular shape with d>d', then the HC-PCF 10 will be polarization maintaining.

Depending on temperature and the speed of the draw, the size of the resulting HC-PCF can be controlled so that it is basically uniform (with the outside dimensions constant) along its length, as shown in FIG. 5c, or it can taper so that the outside dimensions uniformly decrease in size along its length, as shown by FIG. 5d.

A tapered HC-PCF is useful as it will enable pulse shortening along a long SBS PCM. If a relatively wide pulse is applied to the larger end 25 of the tapered HC-PCF, a reflected pulse-shortened output will appear, also at the larger end 25.

The tapered HC-PCF of FIG. 5d can also be joined to and end of the uniform HC-PCF of FIG. 5c.

The HC-PCFs 10 of FIGS. 5c and 5d would be preferably wound in loops and placed into a vessel 12 with a suitable gas as previously described with reference to FIGS. 2 and 3. If gIL is greater than about 10, SBS will occur and the HC-PCF 10 in the vessel 12 will function as a SBS PCM. The value of gIL can be controlled in a number of ways and one way of fixing it for any particular embodiment is by the selection of the particular gas used and by controlling its pressure in vessel 12. If the gIL of an embodiment is maintained below about 10, then SBS does not occur and then the HC-PCF 10 in vessel 12 can be used as a passive, self-pumped amplifier 26. FIG. 6 is similar to FIG. 1, but now the externally pumped amplifiers 1–4 have been replaced with self-pumped amplifiers 26, each of which is a vessel 12 and coiled HC-PCF 10 arrangement such as that shown by FIG. 4 (with dual windows 14), but with gIL being set to a value less than about ten. The SBS PCM 28 at the end of the chain is a vessel 12 and a coiled HC-PCF 10 arrangement such as that shown by FIGS. 2–4 (with only one window 14 be needed), but with gIL being set to a value greater than about ten to twenty so that SBS occurs in the HC-PCF 10.

While the present disclosure describes various embodiments, these embodiments are to be understood as illustrative and do not limit the claim scope. Many variations, modifications, additions and improvements of the described embodiments are possible. For example, those having ordinary skill in the art will understand that the process parameters, materials, and dimensions are given by way of example only. The parameters, materials, and dimensions can be varied to achieve the desired structures as well as modifications, which are within the scope of the claims. Variations and modifications of the embodiments disclosed will now suggest themselves to those skilled in the art. The disclosed embodiments best explain the principles of the invention and its practical application to thereby enable others skilled in the art to utilize the disclosed technology in various embodiments and with various modifications as are suited to the particular use contemplated. It is intended that the appended claims be construed to include other alternative embodiments of the invention except insofar as limited by the prior art.

The invention claimed is:

1. An optical device comprising:
a vessel for containing a compressible medium;
a length of hollow core photonic crystal multi-spatial mode fiber disposed in said vessel, said gaseous medium occupying the hollow core of said of hollow core photonic crystal multi-spatial mode fiber and surrounding the exterior of said of hollow core photonic crystal multi-spatial mode fiber; and
at least one sealed window in said vessel, the at least one sealed window being optically coupled to at least one end of said length of hollow core photonic crystal multi-spatial mode fiber.

2. The optical device of claim 1 wherein the compressible medium interacts with the hollow core photonic crystal multi-spatial mode fiber so that Stimulated Brillouin Scattering (SBS) occurs to light guided within the hollow core photonic crystal multi-spatial mode fiber whereby the optical device functions as a phase-conjugate mirror.

3. The optical device of claim 1 wherein the compressible medium is Xe.

4. The optical device of claim 1 wherein the compressible medium is $CH_4$.

5. The optical device of claim 1 wherein the compressible medium is a fluid.

6. The optical device of claim 5 wherein the fluid is water.

7. The optical device of claim 5 wherein the fluid is a cryogenic liquid such as Xe and/or $N_2$, or a critical point media such as $CH_4$ or Freon 113.

8. The optical device of claim 1 wherein the vessel is a sealed cylinder.

9. The optical device of claim 8 wherein the length of hollow core photonic crystal multi-spatial mode, polarization-maintaining fiber has a length which is 10 to 1000 times the circumference of the cylinder.

10. The optical device of claim 1 wherein the fiber is a hollow core photonic crystal multi-spatial, polarization-maintaining fiber.

11. The optical device of claim 1 wherein the hollow core photonic crystal multi-spatial mode fiber in combination with the compressible material has a gIL of more than 10 so that Stimulated Brillouin Scattering (SBS) occurs to light guided within the hollow core photonic crystal multi-spatial mode fiber.

12. The optical device of claim 1 wherein the hollow core photonic crystal multi-spatial mode fiber is tapered along its length.

13. The optical device of claim 1 wherein the hollow core photonic crystal multi-spatial mode fiber has:
(i) a central hollow glass core, and
(ii) a plurality of hollow glass cores surrounding the central hollow glass core and sharing common sidewalls either with one another and/or with the central hollow core,
wherein an opening in the central hollow core has a height dimension which is sufficiently larger than its width dimension in order to maintain polarization of light guided in the hollow core optic fiber.

14. The hollow core optic fiber of claim 13 wherein the plurality of hollow glass cores surrounding the central hollow glass core each have an outside dimension in cross section which is smaller than an outside dimension, in cross section, of the central hollow glass core and wherein a portion of glass cores surrounding the central hollow glass core are disposed on two sides thereof and have relatively larger outside dimensions in cross section than do other glass cores in said plurality that are arranged on other sides of said central hollow glass core.

15. A hollow core optic fiber having:
(i) a central hollow glass core, and
(ii) a plurality of hollow glass cores surrounding the central hollow glass core and sharing common sidewalls either with one another and/or with the central hollow core,
wherein an opening in the central hollow core has a height dimension which is sufficiently larger than its width dimension in order to maintain polarization of light guided in the hollow core optic fiber and wherein the hollow core optic fiber is a multi-spatial mode fiber.

16. The hollow core optic fiber of claim 15 wherein the plurality of hollow glass cores surrounding the central hollow glass core each have an outside dimension in cross section which is smaller than an outside dimension, in cross section, of the central hollow glass core and wherein a portion of glass cores surrounding the central hollow glass core are disposed on two sides thereof and have relatively larger outside dimensions in cross section than do other glass cores in said plurality that are arranged on other sides of said central hollow glass core.

17. A Phase Conjugate Master Oscillator Power Amplifier comprising:
a laser;
a plurality of optical amplifiers arranged in a series connected at one end of the series to receive light from the laser;
a phase-conjugate mirror arranged an another end of the series, the phase conjugate mirror and the optical amplifiers each comprising:
(i) a vessel for containing a compressible medium;
(ii) a length of hollow core photonic crystal multi-spatial mode fiber disposed in said vessel, said gaseous medium occupying the hollow core of said of hollow core photonic crystal multi-spatial mode fiber and surrounding the exterior of said of hollow core photonic crystal multi-spatial mode fiber; and
(iii) at least one sealed window in said vessel, the at least one sealed window being optically coupled to at least one end of said length of hollow core photonic crystal multi-spatial mode fiber;
wherein the compressible medium and the hollow core photonic crystal multi-spatial mode fiber selected for the phase conjugate mirror promote Stimulated Brillouin Scattering (SBS) while the compressible medium and the hollow core photonic crystal multi-spatial mode fiber selected for the amplifiers inhibit SBS.

18. The Phase Conjugate Master Oscillator Power Amplifier of claim 17 wherein the hollow core photonic crystal multi-spatial mode fiber has:
(i) a central hollow glass core, and
(ii) a plurality of hollow glass cores surrounding the central hollow glass core and sharing common sidewalls either with one another and/or with the central hollow core,
wherein an opening in the central hollow core has a height dimension which is sufficiently larger than its width dimension in order to maintain polarization of light guided in the hollow core optic fiber.

19. The Phase Conjugate Master Oscillator Power Amplifier claim 18 wherein the plurality of hollow glass cores surrounding the central hollow glass core each have an outside dimension in cross section which is smaller than an outside dimension, in cross section, of the central hollow glass core and wherein a portion of glass cores surrounding the central hollow glass core are disposed on two sides thereof and have relatively larger outside dimensions in cross section than do other glass cores in said plurality that are arranged on other sides of said central hollow glass core.

* * * * *